Oct. 24, 1967     R. A. WINBLAD ETAL     3,348,592
TIMBER HARVESTING MACHINE
Filed Aug. 4, 1965                         11 Sheets-Sheet 1

INVENTORS
Robert A. Winblad
Roland W. Wagner
BY Pearce & Schaeperklaus
ATTORNEYS

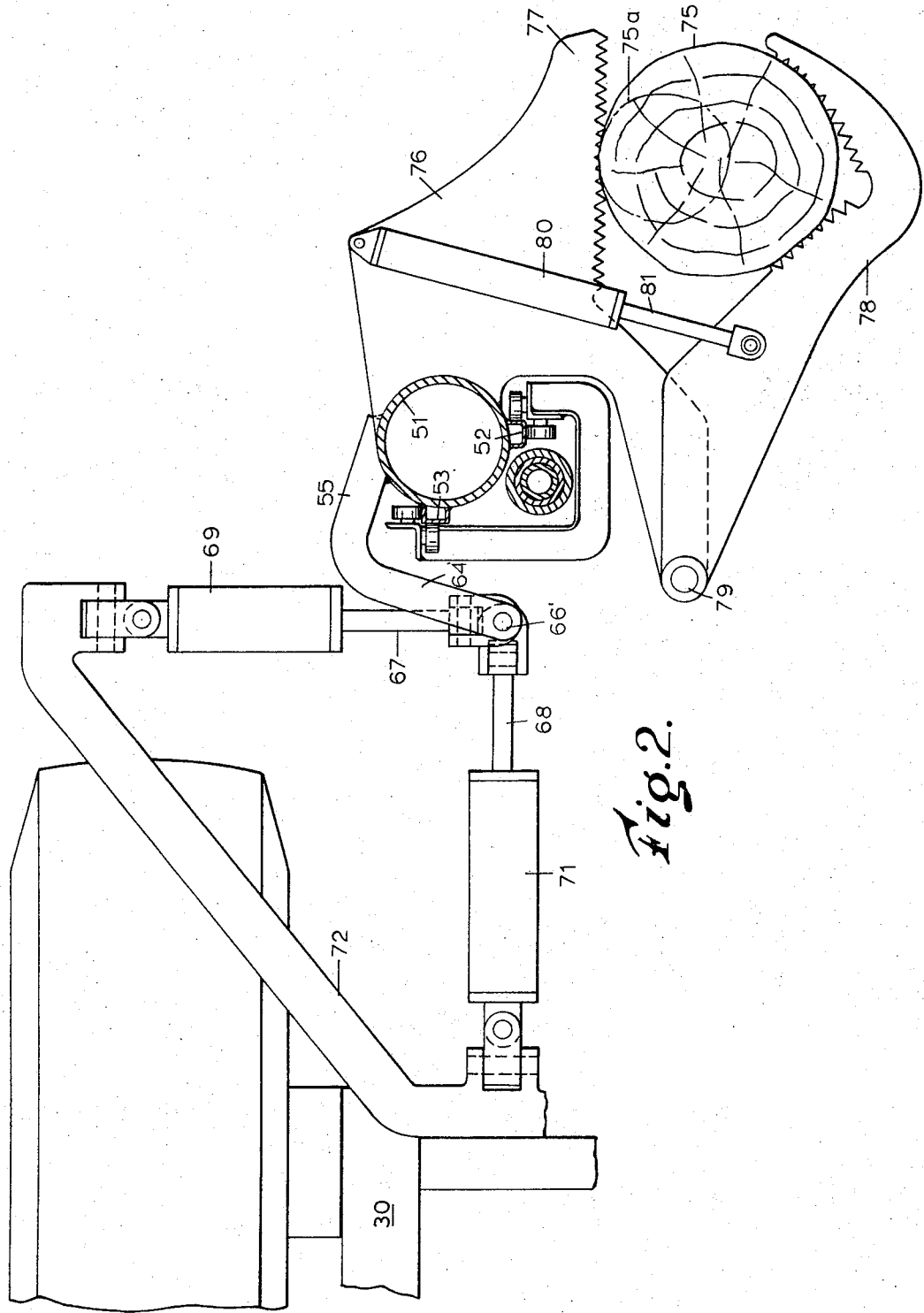

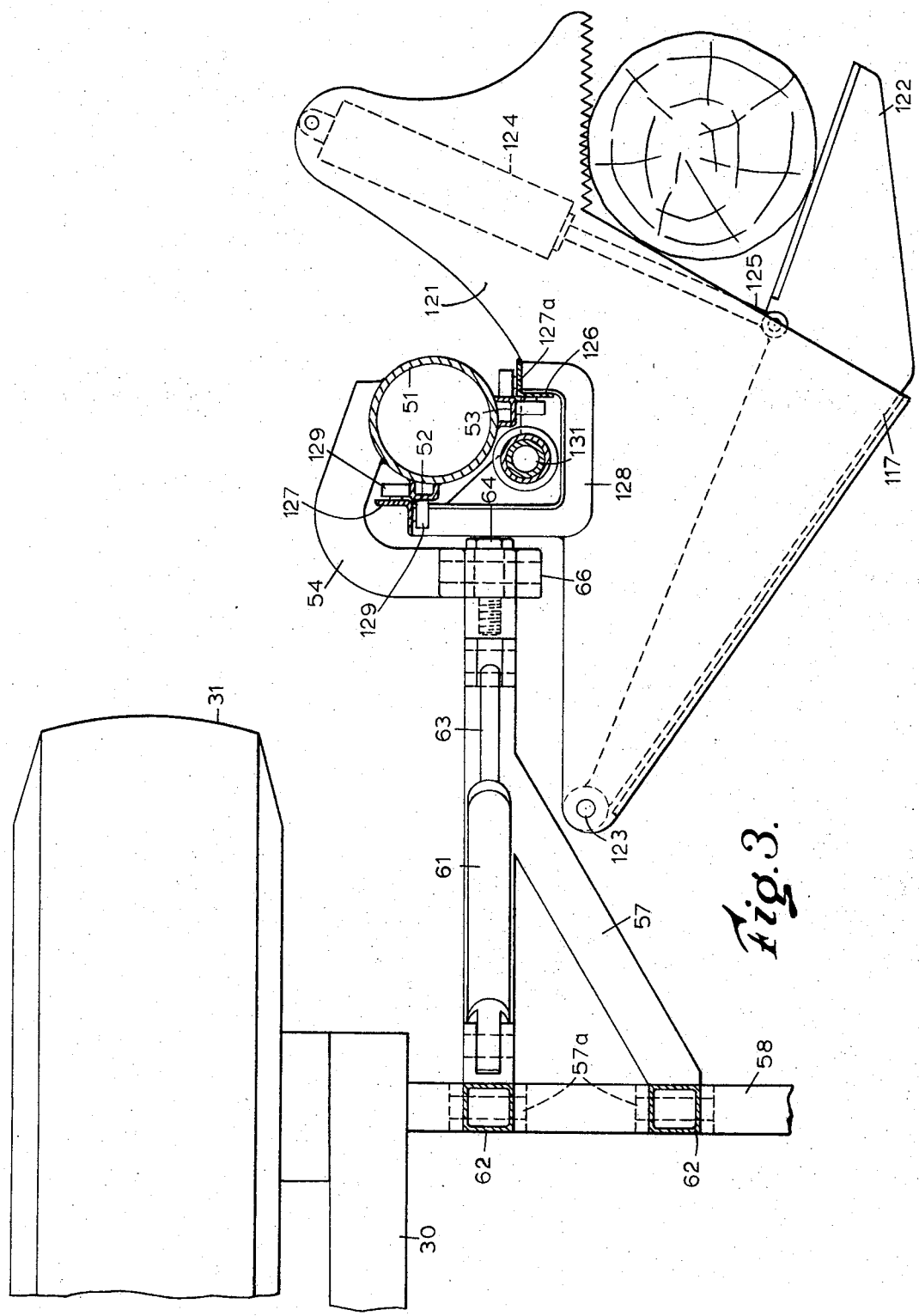

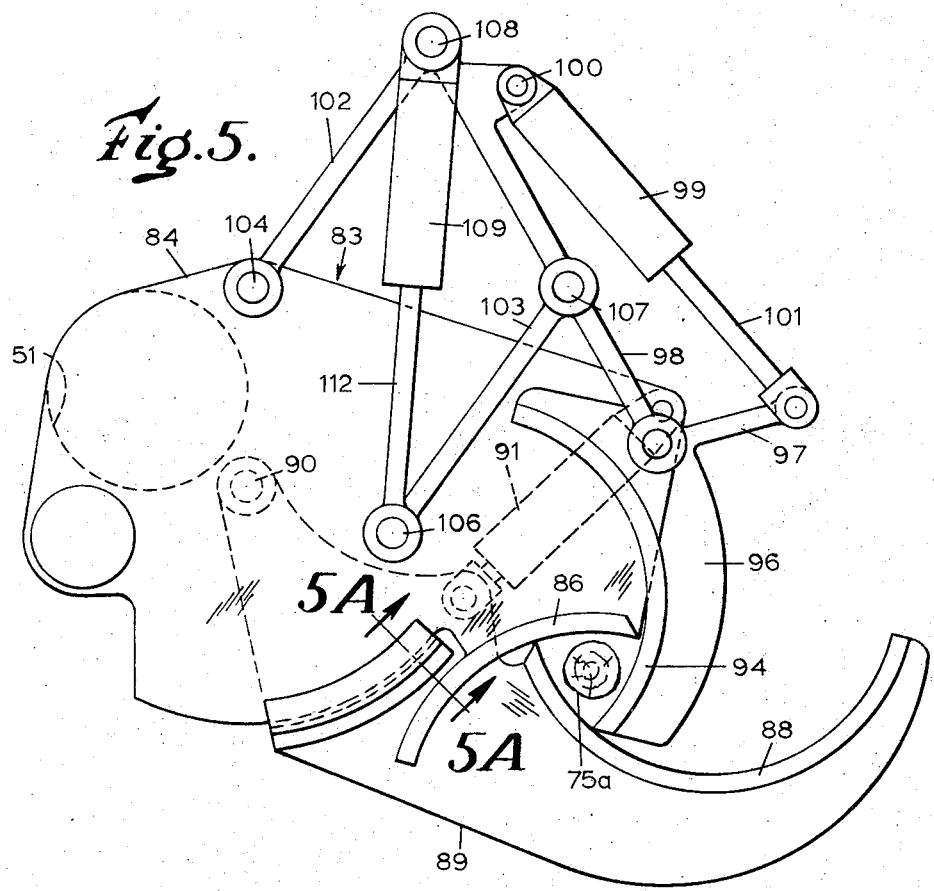
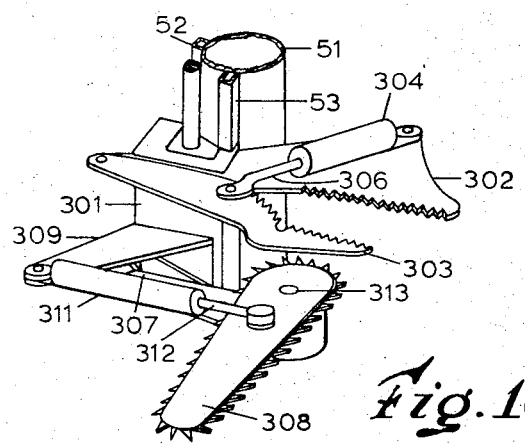
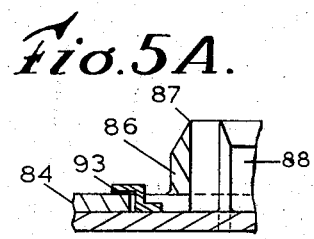

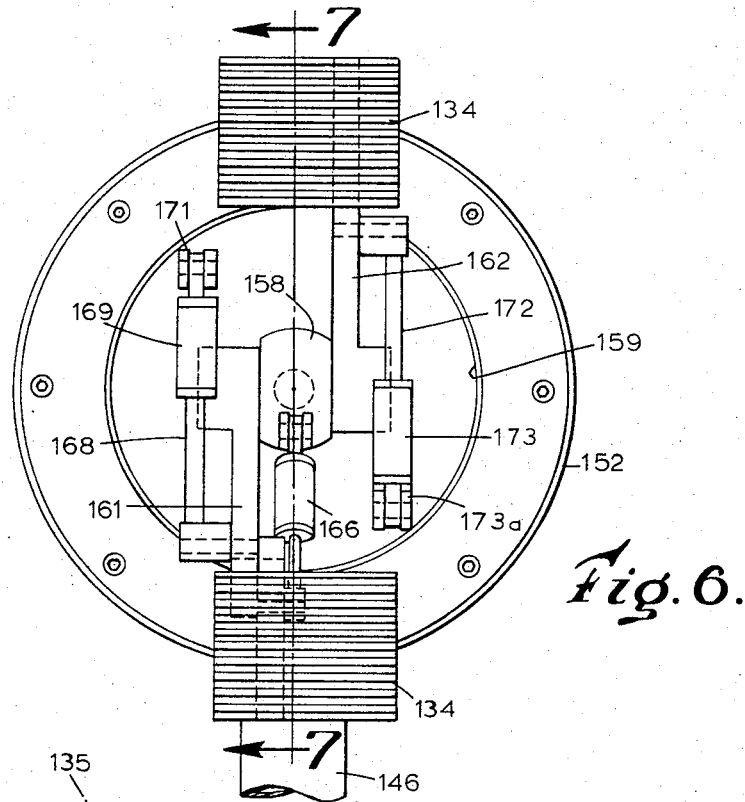
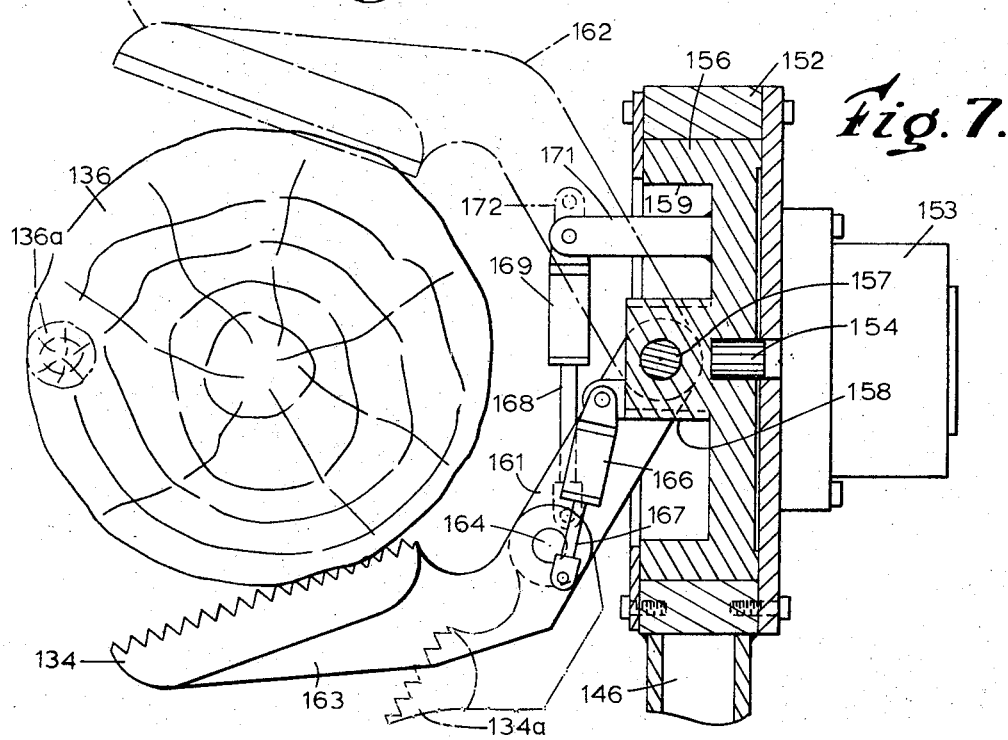

United States Patent Office 3,348,592
Patented Oct. 24, 1967

3,348,592
TIMBER HARVESTING MACHINE
Robert A. Winblad, Cincinnati, and Roland W. Wagner, Sharonville, Ohio, assignors, by direct and mesne assignments, to The Cincinnati Milling Machine Company, Cincinnati, Ohio, a corporation of Ohio
Filed Aug. 4, 1965, Ser. No. 477,254
17 Claims. (Cl. 144—3)

ABSTRACT OF THE DISCLOSURE

A tree harvesting machine which advances to a tree and holds the tree in upright position as the tree trunk is severed from a stump and while sections of the trunk are severed therefrom, the trunk being drawn downwardly as sections are severed, limbs being cut from the trunk as the trunk is drawn downwardly, the sections being transferred to a bin which travels with the machine.

---

This invention relates to machines for harvesting timber and the like.

An object of this invention is to provide a machine which can advance to a tree and hold the trunk of the tree in upright position after the tree trunk has been severed from a stump and which can cut the trunk of the tree into lengths while maintaining the trunk upright either at the site of the stump or while moving to the next tree to be cut.

A further object of this invention is to provide a machine of this type which strips branches from the trunk of the tree while the trunk is being cut into lengths.

A further object of this invention is to provide a machine of this type having trunk severing means such as a shear or saw which can first sever the trunk from the stump and which can then be raised to cut off a length or bolt of the trunk while the remainder of the tree is held upright and is supported by the machine in an upright position.

A further object of this invention is to provide a machine of this type in which a transfer arm is provided which holds the length while it is being severed from the rest of the tree and then transfers the length to a bin or the like.

A further object of this invention is to provide a machine of this type in which, once a length has been transferred, clamp means engages the remainder of the trunk and draws the trunk downwardly to a position at which the cutting means can sever another length and in which an adjustable sized ring is provided which surrounds the tree and has an upwardly directed cutting edge which severs branches as the trunk is drawn downwardly.

A further object of this invention is to provide a machine of this type in which the severing means includes shears which can operate both for severing the trunk and as the clamp for engaging the trunk of the tree to draw it downwardly.

A further object of this invention is to provide a machine of this type in which the mechanism of the machine is carried on an articulated framework capable of progressing over rough terrain and in which the tree severing apparatus is on one section of the framework and the storage bin is on another section and in which part of the mechanism for operating the transfer arm is located on the first section and controls movement of the transfer arm as the length is moved sidewise out of position below the remainder of the tree and a second portion of the mechanism for operating the transfer arm is mounted on the other section of the framework and controls delivery of the length to the bin.

The above and other objects and features of the invention will be apparent to those skilled in the art to which this invention pertains from the following detailed description, and the drawings, in which:

FIG. 2 is an enlarged view in section taken on the line 2—2 in FIG. 1;

FIG. 3 is an enlarged view in section taken on the line 3—3 in FIG. 1;

FIG. 5 is an enlarged plan view taken in the same direction as FIG. 4, the limb severing mechanism being shown in an inwardly collapsed position for surrounding a portion of a tree trunk of reduced diameter;

FIG. 5A is a fragmentary view in section taken on the line 5A—5A in FIG. 5;

FIG. 6 is an enlarged view in side elevation of a head portion of a transfer arm forming a part of the machine;

FIG. 7 is a view in section taken on the line 7—7 in FIG. 6, the position of one of the jaws which is outside the portion shown, being indicated in dot-dash lines, the other jaw being shown in a log releasing position in double-dot dash lines;

FIG. 10 is a perspective view showing an alternate form of tree severing mechanism mounted on the machine.

In the following detailed description and the drawings, like reference characters indicate like parts.

Figure 1:
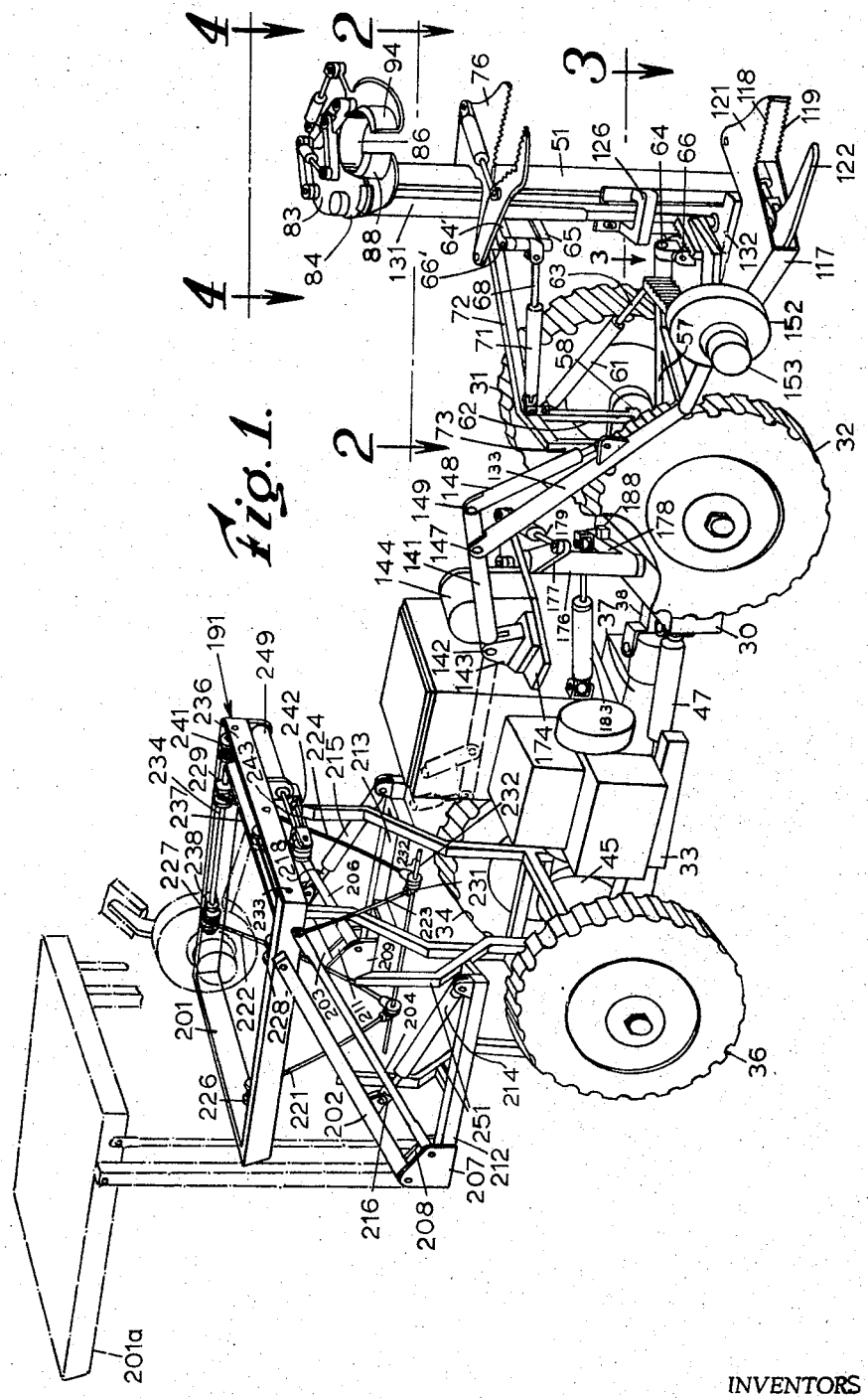
FIG. 1 is a perspective, somewhat schematic, view showing a timber harvesting machine constructed in accordance with an embodiment of this invention.
Figure 1A:
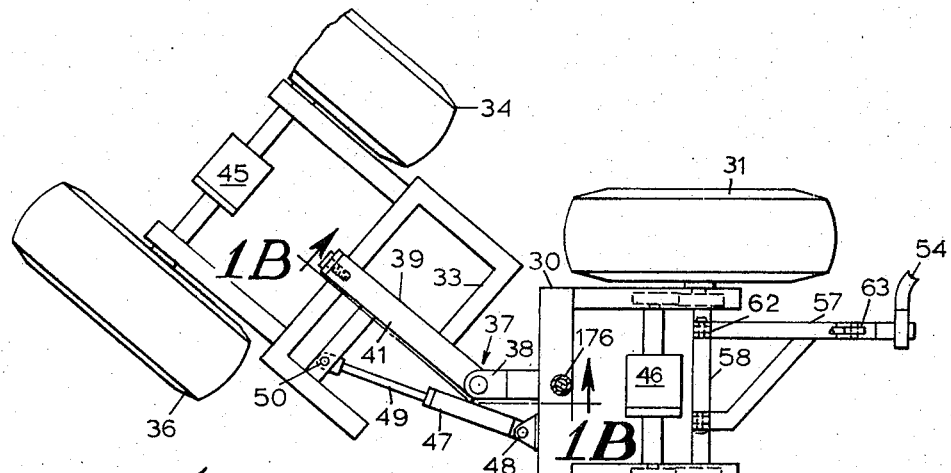
FIG. 1A is a somewhat schematic plan view of the machine with upper portions removed.
Figure 1B:
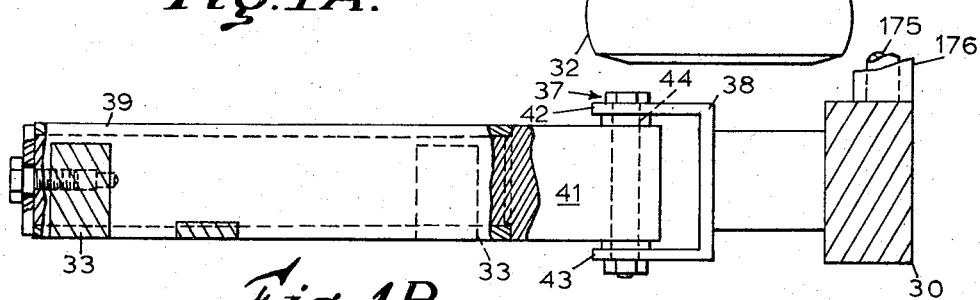
FIG. 1B is a view in section taken on the line 1B—1B in FIG. 1A.

In FIG. 1 is shown a timber harvesting machine constructed in accordance with an embodiment of this invention which includes a first frame section 30 mounted on wheels 31 and 32 and a second frame section 33 mounted on wheels 34 and 36. The sections 30 and 33 are linked by a coupling 37 which, as shown in FIG. 1B, includes a fork 38 mounted on the first frame section 30, a linking sleeve 39 mounted on the second frame section 33 and a linking rod 41 coaxial with and pivotally mounted in the sleeve 39 and also pivotally mounted between arms 42 and 43 of the fork 38 on a pivot pin 44 so that the frame sections are connected by an articulated framework capable of permitting pivotal movement between the frame sections so that the entire framework can progress across rough ground with all four wheels remaining on the ground at all times.

The wheels are driven by appropriate hydraulic motors 45 and 46 (FIG. 1A) which advance the machine over the ground. Appropriate shafts and gears, not shown in detail, connect the motors to the wheels in driving relation. The machine is steered by means of a hydraulic steering cylinder 47 pivotally mounted on the frame section 30 as indicated at 48. A piston rod 49 driven by the cylinder 47 is pivotally connected to the frame section 33 as indicated at 50. The pivots 48 and 50 are of a ball and socket type connection to permit articulation of the steering connections.

Figure 7C:
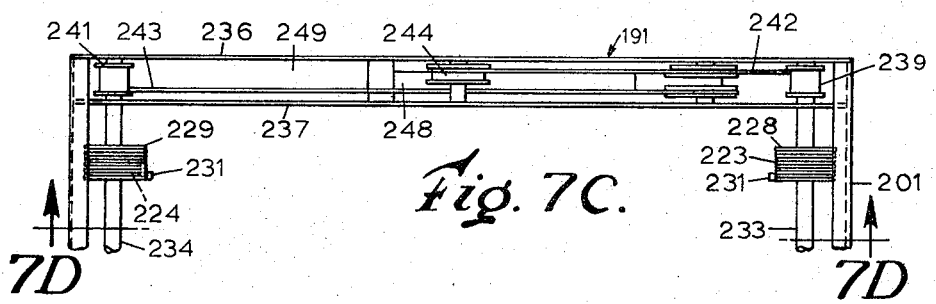
FIG. 7C is a fragmentary plan view of a log collecting assembly which is a part of the machine.
Figure 7D:
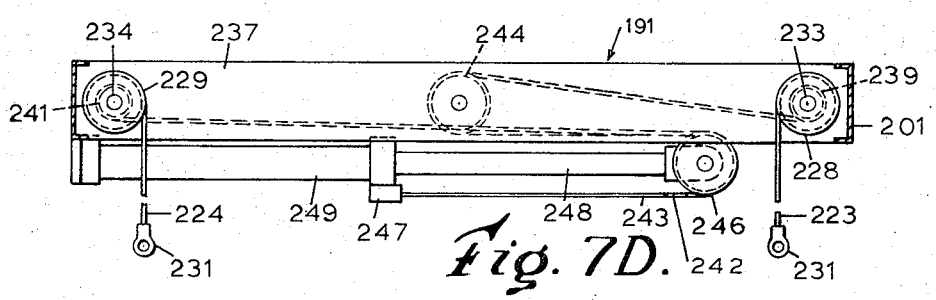
FIG. 7D is a view in section taken on the line 7D—7D in FIG. 7C.
Figure 7A:
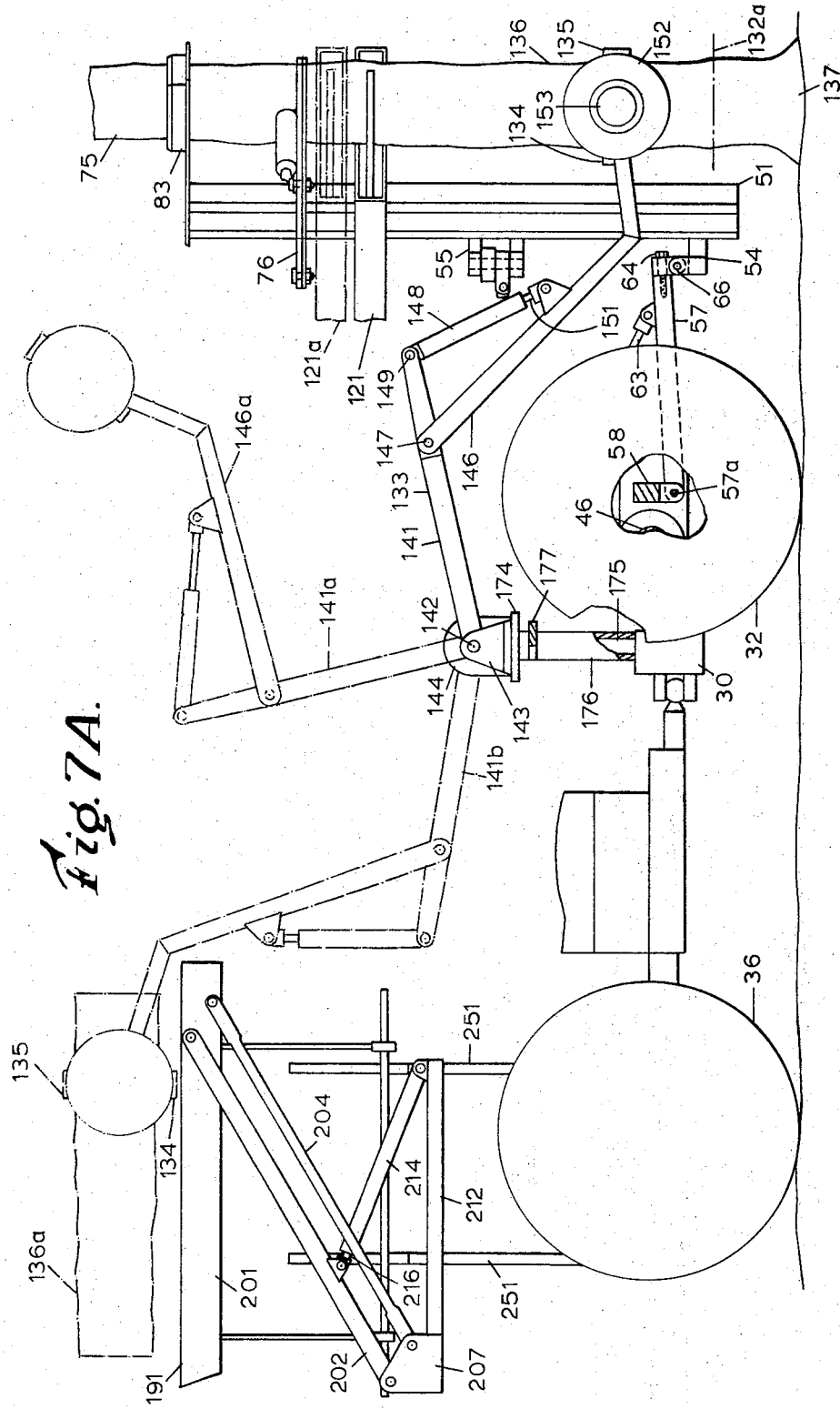
FIG. 7A is a somewhat schematic view in side elevation showing a transfer arm in a tree holding first position in full lines, in an intermediate position in double-dot dash lines, and in a delivery position in dot-dash lines.

The first frame section 30 carries a mast 51 (FIG. 1) which can be of heavy metal tubing or the like, to which guide tracks 52 and 53 (FIG. 3) are welded. The mast is supported by a lower bracket 54 and an upper bracket 55 (FIG. 2) which are rigidly welded to the mast. The lower mast bracket 54 is carried by a mast frame 57 pivotally mounted at 57a on a cross frame 58 which is a part of the frame section 30 as indicated in FIG. 7A. The mast frame 57 is swung up and down by means of a hydraulic cylinder 61 (FIG. 1) which is pivotally connected to an upright frame 62 which is part of the first frame section 30 and actuates a piston rod 63 pivotally connected to the mast frame 57 spaced from the pivot 57a thereof. As shown in FIG. 7A, the connection between the mast frame 57 and the lower mast supporting bracket includes pivots 64 and 66 having generally horizontal axes which extend transversely of each other so that the mast can swing about generally horizontal axes through the lower support bracket while being supported thereby; and the mast can be raised and lowered by operation of the cylinder 61 and the piston rod 63.

The upper mast bracket 55 includes parallel arms 64' and 65 (FIG. 1) between which is mounted an upright pivot pin 66' to which piston rods 67 and 68 are pivotally connected (FIG. 2). The piston rods 67 and 68 are actuated by cylinders 69 and 71, respectively. As shown in FIG. 2, the cylinders 69 and 71 are pivotally mounted on a horizontal frame 72 which is carried by the upright frame 62 (FIG. 1) and by another upright frame 73, both of which are part of the frame section 30. As shown in FIG. 2, the axes of the cylinders 69 and 71 are substantially at right angles to each other so that the axis of the mast 51 can be swung in all directions to bring the axis of the mast into substantial parallelism with a trunk of a tree 75, as shown in FIG. 7A.

When the mast has been swung into parallelism with the trunk of the tree, the machine is advanced to bring a clamp 76 (FIG. 2) into position for engaging the trunk. The clamp 76 includes a stationary jaw 77 mounted on the mast 51 and a swinging jaw 78 pivotally mounted on the stationary jaw at 79. A cylinder 80 pivotally mounted on the stationary jaw actuates a piston rod 81 pivotally mounted on the swinging jaw for driving the swinging jaw into position to engage and grip the tree trunk 75. The cylinder is constructed so that the jaws can engage a large portion of the trunk as indicated in full lines in FIG. 2 or a smaller portion of the trunk 75a as shown in dot-dash lines.

Figure 4:
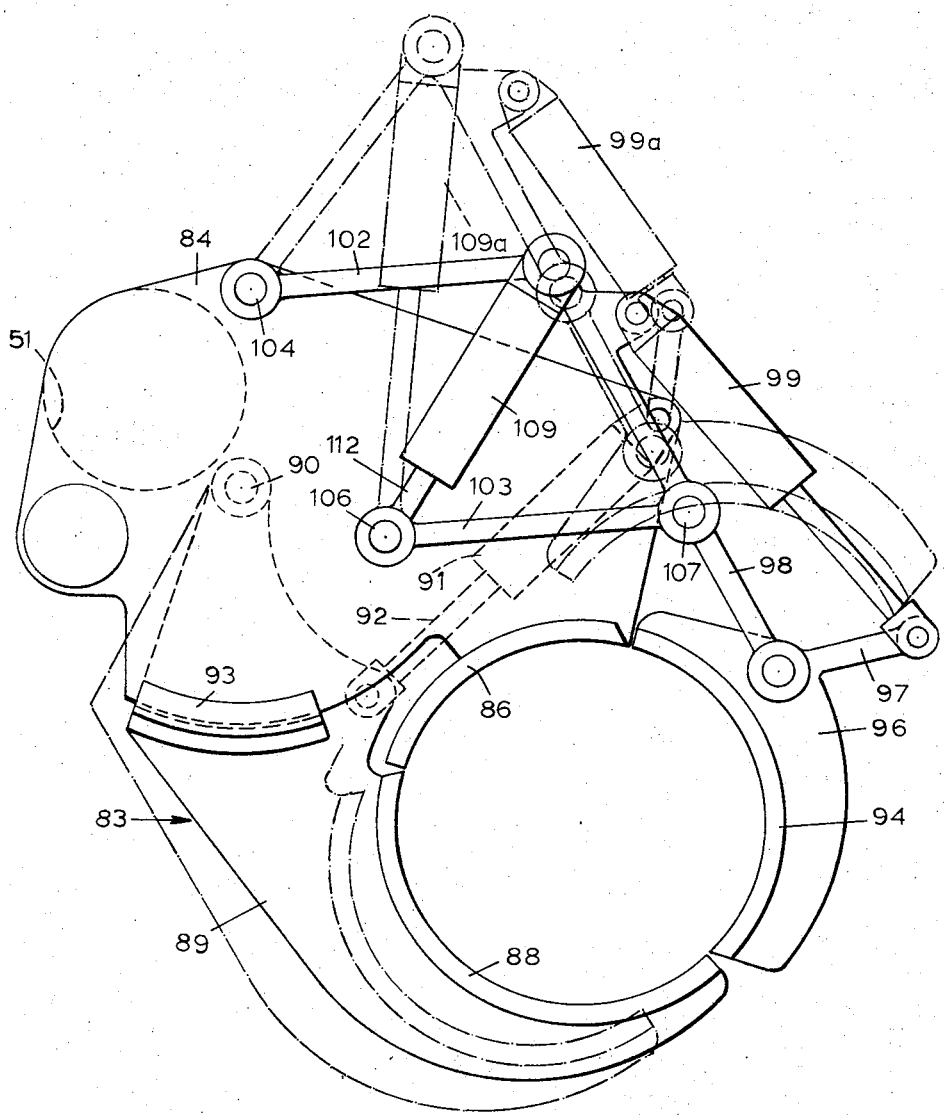
FIG. 4 is an enlarged plan view taken in the direction of the arrows 4—4 in FIG. 1, a limb removing mechanism being shown in open, tree receiving position in dot-dash lines, and in tree engaging position in full lines.

When the tree is engaged by the clamp 76, a de-limbing assembly 83 is brought into position surrounding the trunk of the tree. The de-limbing assembly is mounted on a plate 84 (FIGS. 4 and 5) which is supported on an upper end of the mast 51. Details of construction of the de-limbing assembly are shown in FIGS. 4 and 5. A stationary arcuate blade or arc 86 is mounted on plate 84. The arcuate blade 86 has an upwardly directed cutting edge 87, as shown in FIG. 5A. A first movable arcuate blade or arc 88 is mounted on a swinging plate 89 pivotally mounted on the underside of the plate 84 at 90. A cylinder 91 pivotally mounted on the plate 84 and a piston rod 92 pivotally connected to the swinging plate 89 can swing the plate 89 from the positions shown in FIG. 4 to that shown in FIG. 5. The swinging plate 89 underlies the plate 84 and carries an angle-shaped support flange 93 which overlies an edge portion of the plate 84, as shown in FIG. 5A. Another movable arcuate blade or arc 94 is mounted on a frame 96 which carries a crank 97. The frame 96 is pivotally mounted at one end of a frame lever 98. A first cylinder 99 is pivotally mounted adjacent the other end of the frame lever 98 at 100 and operates a piston rod 101 which is pivotally connected to the crank 97. The frame lever 98 is mounted on links 102 and 103. One end of the link 102 is pivotally mounted on an upper face of the plate 84 as indicated at 104. One end of the link 103 is also mounted on the upper face of the plate 84 as indicated at 106. The other end of the link 103 is pivotally connected to the frame lever 98 centrally thereof at 107. The other end of the link 102 is pivotally connected to the frame lever 98 at 108 adjacent the pivot of the cylinder 99. Another cylinder 109 is pivotally connected to the frame lever 98 at the pivot 108. A piston rod 112 operated by the cylinder 109 is pivotally connected to the upper face of the plate 84 at the pivot 106. As the cylinders 91, 99 and 109 are actuated, the arcuate blades 88 and 94 can be swung progressively from the open position shown in dot-dash lines in FIG. 4 through the position shown in full lines in FIG. 4, where the arcuate blades are shown in position to surround a tree trunk section, to the position shown in FIG. 5 where the arcuate blades have moved into position to surround a smaller tree section 75a, such as is found near the upper end of the tree. Each of the arcuate blades is provided with an upwardly directed shear edge, one of the shear edges being indicated at 87 in FIG. 5A, as already indicated.

When the trunk of the tree is engaged by the clamp 76 (FIG. 1) and surrounded by the arcuate blades 86, 88 and 94, a shear (117 is in the position shown in FIG. 3 ready for shearing the trunk of the tree close to the ground to cut the trunk of the tree from a stump. The shear 117 includes a pair of parallel spaced stationary jaws 118 and 119 (FIG. 1) mounted in a housing or casing 121. A shear blade 122 is provided which is pivotally mounted in the housing 121 at 123. A cylinder 124 pivotally mounted in the housing 121 actuates a piston rod 125 pivotally connected to the shear blade 122 for actuating the blade to shear the tree trunk adjacent the ground. The housing is mounted on a carriage 126 which includes upright members 127 and 127a and a linking frame 128. Wheels 129 (not all of which are shown) mounted on the upright members 127 and 127a run on the guide tracks 52 and 53 to guide the carriage and the shear housing 121. The carriage is raised and lowered by means of a multistage hydraulic cylinder 131 which extends between the plate 84 (FIG. 1) and a bracket 132 mounted on the housing 121.

When the tree trunk has been severed, as at the line 132a in FIG. 7A, the shear blade is retracted, and the mast is raised a short distance by operation of the cylinder 61 (FIG. 1) to release the rest of the tree from the stump. Then the shear housing 121 is raised to the position shown in full lines in FIG. 7A. Then a transfer arm assembly 133 is swung into the full line position of FIG. 7A and jaws 134 and 135 thereof are brought toward each other to grip and hold the trunk in position. Details of construction of the transfer arm assembly will be described in greater detail hereafter. When the shear housing has been raised to the full line position of FIG. 7A, a second cut is made by the shear blade to separate a length or bolt 136 of the tree from the remainder of the tree with the remainder of the tree remaining erect and held in upright position by the clamp 76 and the de-limbing assembly 83. When the bolt has been separated, the transfer arm assembly transfers it away from beneath the remainder of the tree in a manner to be described hereinafter. The bolt is free to be removed because the remainder of the tree, including the bolt, was raised before severing of the bolt. Then the shear housing is raised a short distance higher, as to the position shown in dot-dash lines at 121a in FIG. 7A at which the shear blade is brought into engagement with the tree trunk again but only with enough force to grip the tree trunk and without sufficient force to shear it. The clamp 76 is then released, and the shear housing 121 is drawn downwardly by action of the cylinder 131 (FIG. 1) to draw the remainder of the tree downwardly through the de-limbing assembly 83. As the tree is drawn through the de-limbing assembly, limbs are sheared from the trunk of the tree. When the lower end of the remainder of the tree has been drawn downwardly to a position adjacent and spaced a short distance above a stump 137, the clamp 76 is again brought into engagement with the remainder of the tree, the shear blade is again raised to the full line position of FIG. 7A, and the transfer arm assembly 133, having disposed of the first bolt of the tree, is brought back into the full line position of FIG. 7A, and the cycle is repeated. As the diameter of the remainder of the tree is reduced, the arcuate blades of the de-limbing assembly are swung inwardly, as shown in FIG. 5, so that the arcuate blades remain surrounding and in closely spaced relation to the trunk of the tree as the tree is drawn downwardly.

Figure 7B:
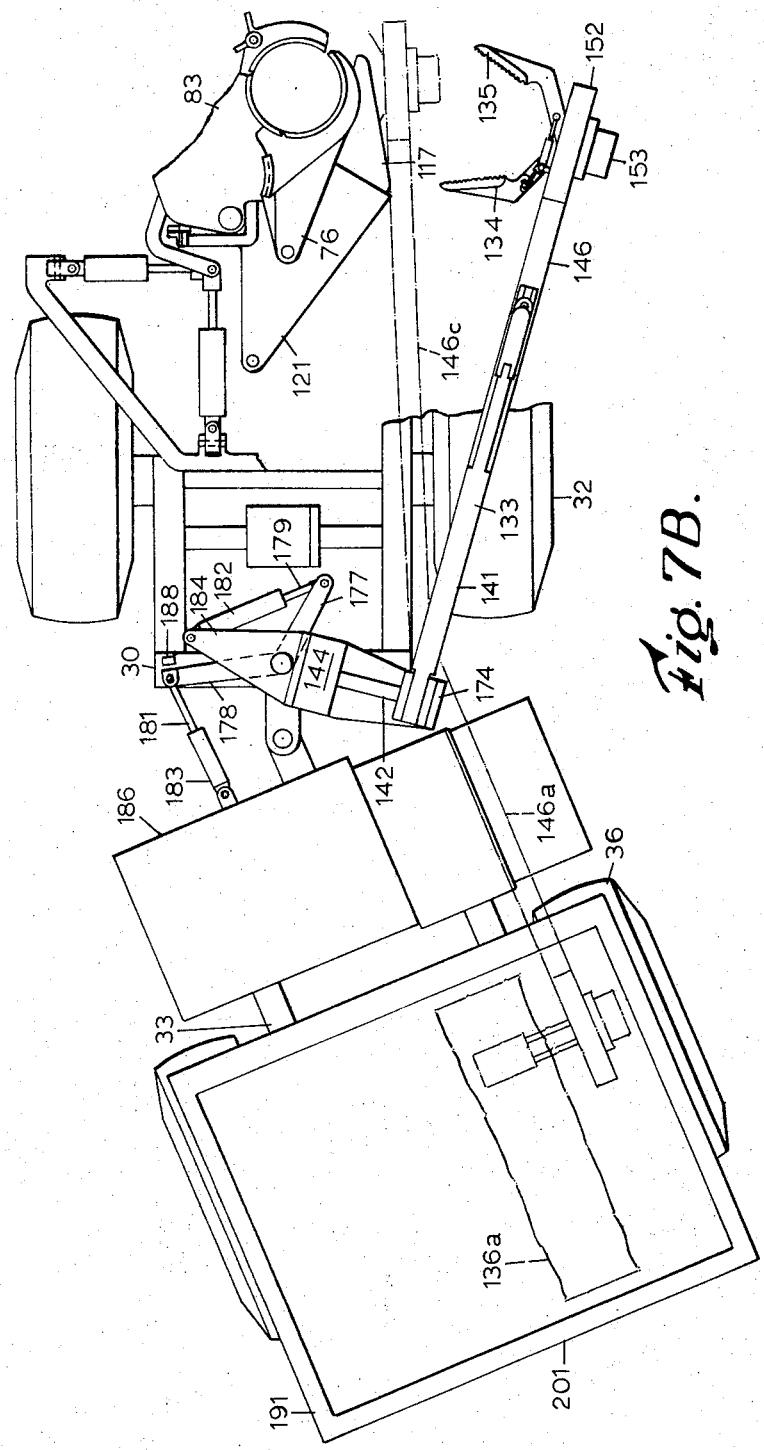
FIG. 7B is a somewhat schematic plan view showing the transfer arm in tree engaging position in dot-dash lines, in a disengaged position in full lines, and in delivery position in double-dot dash lines.

Details of construction of the transfer arm assembly are shown in FIGS. 1, 7A and 7B.

As shown most clearly in FIGS. 1 and 7A, the transfer arm assembly 133 includes a pivoted member or mast 141, which is carried on a shaft 142, pivotally supported on a bracket 143. The shaft 142 is driven by a hydraulic motor 144 which can swing the pivoted member from a tree-holding full-line position of FIG. 7A through an upright double dot-dash line position 141a to a discharge position indicated in dot-dash lines at 141b. A boom 146 is pivotally mounted on the member 141 at 147 spaced from the ends of the member. The boom 146 is angle-shaped as shown. A cylinder 148, pivotally mounted at a free end 149 of the member 141 drives a piston rod 151 pivotally connected to the boom 146 to swing the boom from the extended full-line tree-gripping position of FIG. 1 to a folded double-dot line position 146a at which the boom is folded inwardly into position to swing free of the tree as the mast moves through upright position. At a free end of the boom 146 is mounted a housing 152 which carries a hydraulic motor 153 which drives a shaft 154 (FIG. 7) on which is mounted a jaw-supporting disc 156. The jaw-supporting disc 156 can swing with the shaft 154 inside the housing 152. A pivot pin 157 is mounted in a boss 158 which extends upwardly from a base of a well 159 in the disc 156. The axis of the pin 157 extends transversely of the shaft 154. Jaw-supporting arms 161 and 162 are pivotally mounted on the pin 157. The arm 162 carries the jaw 135. A jaw frame 163, which carries the jaw 134, is pivotally connected to the arm 161. The jaw 134 and the jaw frame 163 can swing about a pivot 164 between the full line position of FIG. 7 and a double-dot dash line position where the jaw is indicated at 134a. A cylinder 166 pivotally mounted on the boss 158 drives a piston rod 167 pivotally connected to the jaw frame 163 to swing the jaw frame 163 and the jaw 134 with respect to the jaw supporting arm 161. A piston rod 168 is pivotally connected to the jaw supporting arm 161 and is driven by a cylinder 169. The cylinder 169 is pivotally mounted on a post 171, which is attached to the disc 156. The jaw supporting arm 162 is pivotally connected to a piston rod 172 (FIG. 6. The piston rod 172 is driven by a cylinder 173 pivotally mounted on a stud 173a attached to the disc 156. Actuation of the cylinders 166, 169 and 173 can cause the jaws to swing into engagement with the bolt 136, as shown in full lines, or with a smaller bolt indicated in double-dot dash lines at 136a.

As shown in FIGS. 1 and 7A, the member 141 and the motor 144 are supported on a table 174. The table 174 is pivotally mounted at an upper end of a post 175 (FIG. 7A), which is supported on the frame section 30. A sleeve 176 is pivotally mounted on the post 175 below the table 174. The sleeve 176 carries crank arms 177 and 178 (FIGS. 1 and 7B). As shown in FIG. 7B, the crank arm 177 is pivotally attached to a piston rod 179 and the crank arm 178 is pivotally connected to a piston rod 181. The piston rods 179 and 181 are actuated by cylinders 182 and 183, respectively. The cylinder 182 is pivotally connected to an extension arm 184 of the table 174. The cylinder 183 is pivotally connected to a casing 186 which is supported on the frame section 33.

When the transfer arm assembly is in the full line position of FIG. 7B, the piston rod 181 is extended sufficiently to bring the crank arm 178 into engagement with a stop 188 mounted on the frame section 30, and the piston rod 179 is retracted. When the piston rod 179 is extended, the boom 146 is swung to the dot-dash line position indicated at 146c at which the jaws 134 and 135 are positioned to engage a tree (not shown in FIG. 7B) held by the clamp 76 and the de-limbing assembly 83 and in position for the severing by the shear 117. When a bolt held by the jaws 134 and 135 has been sheared from the remainder of the tree, the cylinder 182 draws the piston rod 179 inwardly to swing the bolt 136 and the transfer arm assembly to the full line position of FIG. 7B. Then the rotary motor 144 swings the transfer arm assembly upwardly from the full line position of FIG. 7A through the double-dot dash line position to the dot-dash line position of FIG. 7A. As the transfer arm assembly swings upwardly, the rotary motor 153 swings the jaws 134 and 135 and the bolt to bring the bolt to a horizontal position 136a as shown in FIG. 7B overlying a log collecting assembly 191. In addition, as the transfer arm assembly swings upwardly, the cylinder 183 retracts the piston 181 to a position wherein the transfer arm assembly is substantially in alignment with the log collecting assembly 191 as the boom is shown at 146a in double-dot dash lines in FIG. 7B. Then the jaw 134 is released to swing to the 134a position of FIG. 7 to allow the bolt to fall into the log collecting assembly.

The log collecting assembly includes an upper frame 201 (FIG. 1) which is supported on links 202, 203, 204 and 206. Lower ends of the links are pivotally mounted on plates 207, 208, 209 and 211 which are mounted on stationary frames 212 and 213. The frames 212 and 213 are supported on the frame section 33. Cylinders 214 and 215 are pivotally mounted on the frames 212 and 213, respectively, and drive piston rods 216 and 218 which are pivotally connected to the links 202 and 203, respectively, so that the upper frame 201 can be swung from the full line position of FIG. 1 to the dot-dash line position at which the upper frame is indicated 201a. When the upper frame is in the dot-dash line position 201a, it is behind the frame sections of the machine.

Logs are collected in a sling supported by the frame 201 which includes cables 221, 222, 223, and 224 which are attached to and run on rollers 226, 227, 228, and 229, respectively. Lower ends of the sling cables carry eye-fittings 231 (FIG. 7D). As shown in FIG. 1, a rod 232 can be received in the eye-fittings to link the sling cables into a sling. The rollers 226 and 228 are mounted on a shaft 233, and the rollers 227 and 229 are mounted on a shaft 234. The shafts 233 and 234 are rotatably mounted in front frame members 236 and 237 of the upper frame 201 and in bearings 238, only one of which is shown (FIG. 1), attached to the frame 201. The shaft 233 carries a roller 239 (FIG. 7D) and the shaft 234 carries a roller 241. As bolts are loaded into the sling, the sling cables are drawn downwardly. Downward movement is restrained by restraining cables 242 and 243 attached to and running on the rollers 239 and 241, respectively. As shown in FIG. 7D, the cable 242 runs over an idle roll 244 and then over a piston-driven roller 246 and is attached to an anchor 247. The restraining cable 243 runs over the piston-driven roller 246 and is attached to the anchor 247. As the roller 246 moves to the left, as shown in FIG. 7C, the sling cables can move downwardly. The roller 246 is carried by a piston rod 248 driven by a cylinder 249, and the sling cables can descend as the piston rod 248 is retracted. Upright frames 251 (FIG. 1) surround the sling cables to keep the load on the cables from swinging sideways as the machine advances and to catch the sling in the event of inadvertent release or downward movement thereof. When the sling is to be unloaded, the frame 201 is raised to the dot-dash line position 201a of FIG. 1 in which the sling is behind the frame sections of the machine so that the sling can be positioned over a conveyance (not shown) and the sling can be lowered to lower the logs into the conveyance, or the logs can be otherwise disposed of.

Figure 8:
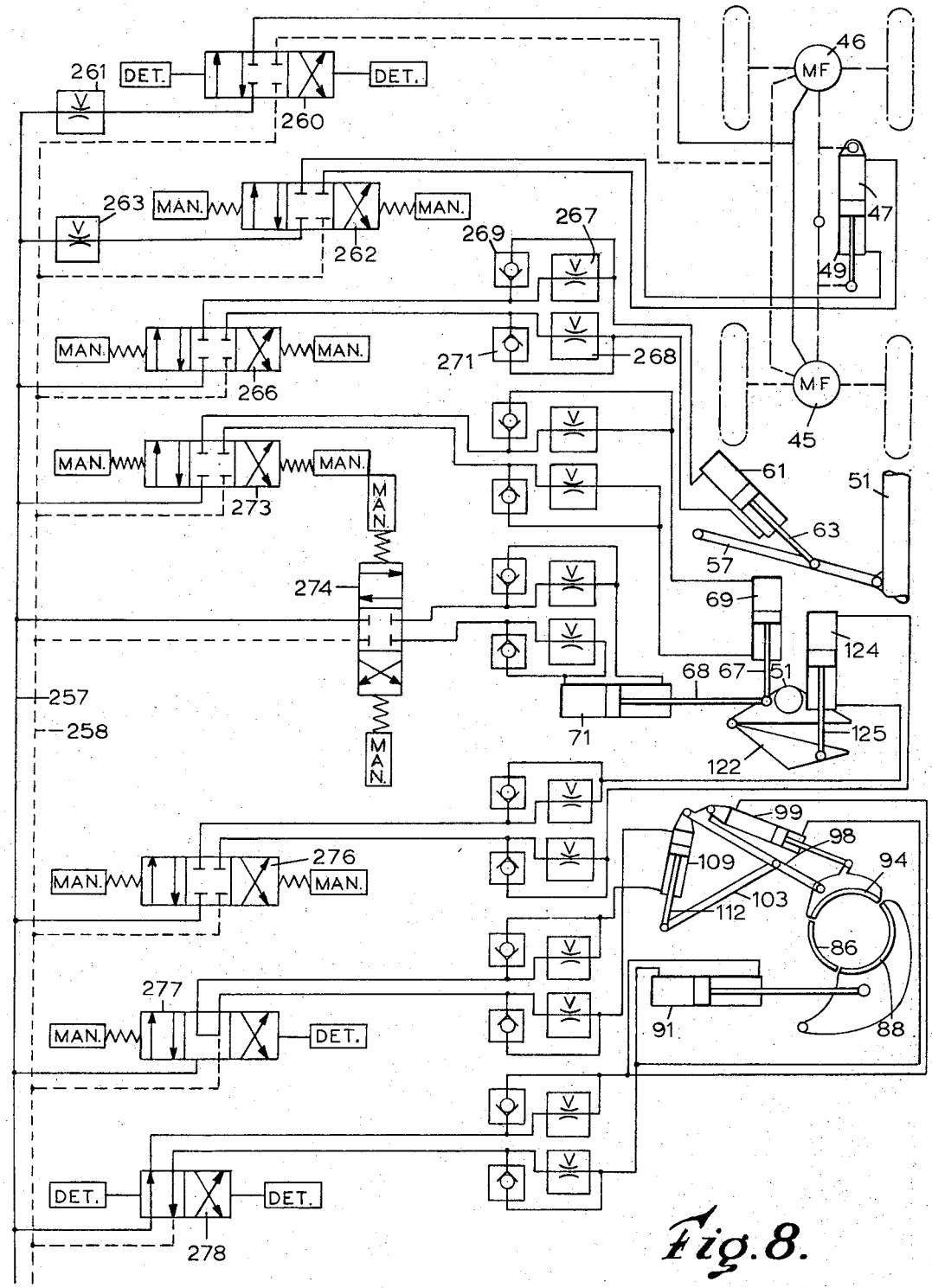
FIG. 8 is a schematic view showing a portion of hydraulic controls of the machine illustrated in FIG. 1.
Figure 9:
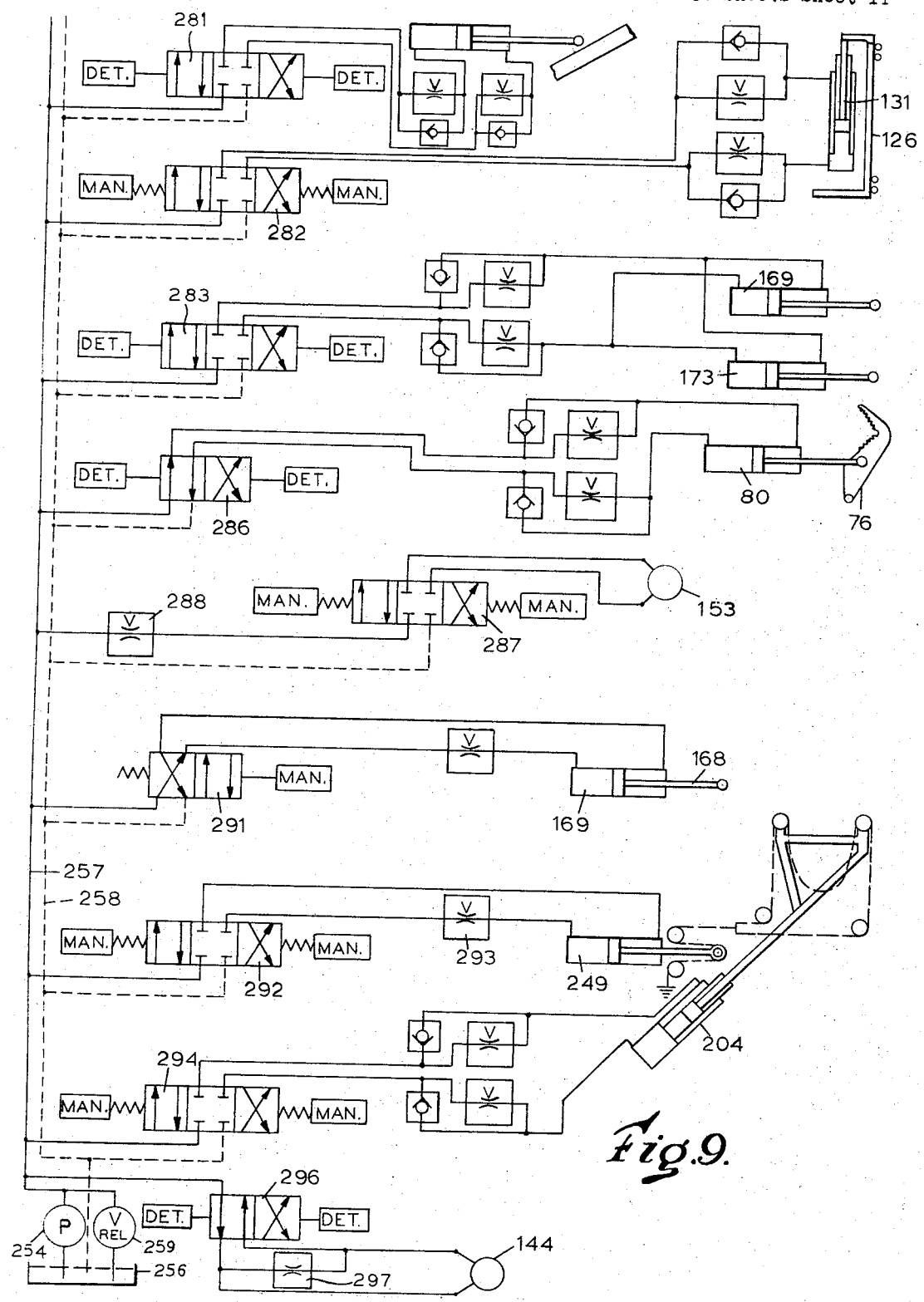
FIG. 9 is a schematic view showing another portion of the hydraulic connections of the machine.

Hydraulic connections for the machine are indicated schematically in FIGS. 8 and 9. Hydraulic power is provided by a pump 254 (FIG. 9) which draws hydraulic fluid from a sump 256 and supplied fluid under pressure to a pressure line 257. Fluid can return through a return line 258 and through a pressure release valve 259.

Power supplied to the motors 45 and 46 (FIG. 8) is controlled by a three-position valve 260. When the valve 260 is in the position shown in FIG. 8, the machine is stationary. When the valve is displaced to one of its alternate positions, the machine is driven either forward or backward. The rate of supply of fluid to the motors 45 and 46 and the rate of advance of the machine is controlled by a throttle valve 261.

Power supplied to the steering cylinder 47 is controlled by a three-position valve 262. A throttle valve 263 controls the rate at which fluid reaches the steering cylinder 47 to control the rate at which the frame sections of the machine are swung with relation to each other when the valve 262 is displaced from the neutral position shown in FIG. 8 to one of its other positions.

Raising and lowering of the mast 51 is controlled by a three-position valve 266 which controls delivery of fluid to the cylinder 61. When the valve 266 is displaced from the neutral position shown, the mast is raised or lowered. The rate of raising or lowering is controlled by throttle valves 267 and 268. Appropriate check valves 269 and 271 are associated with the throttle valves 267 and 268.

The direction of the axis of the mast 51 is controlled by three-position valves 273 and 274 which control supply of hydraulic fluid to the cylinders 69 and 71, respectively. Appropriate throttle valves and check valves are associated with the three-position valves 273 and 274 for controlling the rate of movement of the piston rods 67 and 68 of the cylinders 69 and 71.

Operation of the shear blade 122 is controlled by a three-position valve 276 and appropriate check and throttle valves associated therewith. When the shear blade is to make a cut, the body of the valve 276 is moved to the right as shown in FIG. 8 and held in operative right-hand position while the shear blade makes a cut. On the other hand, when the shear blade is to be used to grip the lower end of the remainder of the tree, the valve body is held in the operative right-hand position only for a sufficient time to permit the shear blade to grip the tree before the body is released to return to the neutral position shown in FIG. 8.

The de-limbing apparatus is controlled by a three-position valve 277 and a two-position valve 278 and appropriate throttle and check valves. The two-position valve 278 supplies power to the cylinders 91 and 99, and when the valve 278 is in its alternate position, the movable arcs 88 and 94 are urged to open position. When the valve 278 is in the position shown, the arcuate blades 88 and 94 are urged toward closed position. The cylinder 109 is connected to the three-position valve 277. When the valve 277 is in its neutral position, the cylinder 109 is connected to a by-pass line in the valve and the piston rod 112 of the cylinder 109 is free to move in either direction. When the valve 277 is in its other positions, the piston rod 112 is driven either inwardly or outwardly. When the machine is to be advanced into engagement with a tree, the valve 278 is disposed in its alternate position and the body of the valve 277 is advanced to the left to detent position to dispose the arcuate blades 88 and 94 in open position as shown in dot-dash lines in FIG. 4. Then, when the machine is in position with respect to the tree, the valve 277 is moved to the right as shown in FIG. 8 to manual position to retract the piston rod 112. When the piston rod 112 has been retracted, the valve 277 is released to be returned to the position shown by spring pressure, and the valve 278 is shifted to the position shown to swing the movable arcuate blades to the position shown in FIG. 4 in full lines to surround the tree. Then the valve 277 is moved to the left to detent position as the tree is cut and drawn downwardly through the de-limbing assembly with the movable arcuate blades being constantly urged inwardly so that, as the tree is drawn downwardly, the arcuate blades converge therearound and are continually in position to shear limbs from the tree. When the tree has been cut into lengths, the valve 278 is shifted to its alternate position, and the machine is ready to be moved to the next tree.

The boom operating cylinder 148 is controlled by a three-position valve 281 (FIG. 9) and appropriate throttle and check valves which permit retraction and extension of the piston rod 151 under control of the valve 281.

The multi-stage cylinder 131 is controlled by a three-position valve 282 and associated throttle and check valves which permit raising and lowering of the multi-stage cylinder 131 to raise and lower the carriage 126 to selected positions.

The jaw operating cylinders 169 and 173 are actuated by a three-position valve 283 and associated throttle and check valves.

The clamp 76 is controlled by a two-position valve 286 and associated check and throttle valves, and the clamp 76 is urged toward open and closed positions under the control of the valve 286.

The jaw swinging motor 153 is controlled by a three-position valve 287 and a throttle valve 288, and the valve 287 can be actuated manually or can be actuated by appropriate mechanical valve operators (not shown) associated with the boom so that, when the boom is in tree-engaging position, the jaws are also in tree-engaging position, and when the boom moves to bolt-releasing position, the jaws are swung to bolt-releasing position. The jaw release cylinder 169 is controlled by a two-position valve 291 and an associated throttle valve, the two-position valve being normally in a position to urge the jaw releasing piston rod 168 to the position in which the jaws are operative.

The cable restraining cylinder 249 is controlled by a three-position valve 292 and a throttle valve 293, which can permit lowering of the sling cables or cause raising thereof.

Frame raising cylinders 204 and 206 (not shown in FIG. 9) are controlled by a three-position valve 294 and associated check and throttle valves.

The motor 144 which swings the pivoted mast 141 and the boom 146 is controlled by a two-position valve 296 and a throttle valve 297.

Actuation of the various valves of the hydraulic controls makes possible control of all portions of the machine from a single location convenient to the operator. If desired, appropriate interlocking connections can be supplied to prevent inadvertent operation of controls when inappropriate.

In the machine which has been described to this point, the shear casing and shear blade function not only for shearing but also as a clamp. An alternate construction of the carriage of the machine is shown in FIG. 10. On the mast 51 is mounted a carriage 301 which runs on the tracks 52 and 53. The carriage 301 carries a stationary clamp jaw 302 on which a movable clamp jaw 303 is pivotally mounted. A cylinder 304 pivotally connected to the stationary clamp jaw 302 operates a piston rod 306 for opening and closing the clamp jaws 302 and 303. Below the stationary clamp jaw 302, a bracket 307 is attached to the carriage 301 and pivotally supports a chain saw frame 308. A second bracket 309 mounted in the carriage 301 pivotally supports a cylinder 311 which operates a piston rod 312. The cylinder 311 causes the chain saw frame 308 to swing about its pivot 313 to position for severing a tree trunk (not shown) engaged by the clamp jaws 302 and 303. Appropriate mechanism (not shown) operates the chain saw. Operation of the machine with the carriage 301 is generally similar to that already described with the exception that, instead of using the shear casing as a clamp, the separate clamp jaws 302 and 303 are used to engage the bottom of the remainder of the tree to draw it downwardly, and a chain saw is used instead of a shear to sever the tree.

The tree harvesting machine described above and illustrated in the drawings is subject to other modifications without departing from the spirit and scope of the appended claims.

Having described our invention, what we claim as new and desire to secure by Letters Patent is:

1. A timber harvesting apparatus comprising a self-propelled vehicle for supporting and conveying a vertical timber harvesting device through a timber stand, said device including a single cut-off unit for severing the trunk of a tree at its base and also at successive locations along the trunk to provide bolts of the desired length, means on the cut-off unit to grip the tree and effect its descent in a vertical direction, and a delimbing unit encircling the trunk of the tree in vertical spaced relation above said cut-off unit for removing the limbs from each trunk section before it is severed from the tree.

2. A timber harvesting apparatus comprising a self-propelled vehicle for supporting and conveying a vertical timber harvesting device through a timber stand, said device including a single cut-off unit for severing the trunk of a tree at its base and also at successive locations along the trunk to provide bolts of the desired length, means on the cut-off unit to grip the tree and effect its descent in a vertical direction, a delimbing unit encircling the trunk of the tree in vertically spaced relation above said cut-off unit for removing the limbs from each trunk section before it is severed from the tree, and a transfer arm assembly comprising a support mounted on the vehicle horizontally spaced from the cut-off unit, a transfer arm mounted on said support, jaw means mounted on said transfer arm remote from the support and engageable with each trunk section as the section is severed, and means for swinging the transfer arm and jaws horizontally to move the trunk section horizontally away from the remainder of the tree.

3. A timber harvesting apparatus comprising a self-propelled vehicle for supporting and conveying a vertical timber harvesting device through a timber stand, said device including a single-cut-off unit for severing the trunk of a tree at its base and also at successive locations along the trunk to provide bolts of the desired length, means on the cut-off unit to grip the tree and effect its descent in a vertical direction, a delimbing unit encircling the trunk of the tree in vertically spaced relation above said cut-off unit for removing the limbs from each trunk section before it is severed from the tree, and a transfer arm assembly comprising a support mounted on the vehicle horizontally spaced from the cut-off unit, a transfer arm mounted on said support, jaw means mounted on said transfer arm remote from the support and engageable with each trunk section as the section is severed, means for swinging the transfer arm and jaws horizontally to move the trunk section horizontally away from the remainder of the tree and for then swinging the transfer arm upwardly and away from the cut-off unit to swing the trunk section of the trunk away therefrom, and means on the vehicle for receiving the trunk section when the trunk section has been swung upwardly and away from the cut-off unit.

4. A timber harvesting apparatus comprising a self-propelled vehicle for supporting and conveying a vertical timber harvesting device through a timber stand, said device including a single cut-off unit for severing the trunk of a tree at its base and also at successive locations along the trunk to provide bolts of the desired length, means on the cut-off unit to grip the tree and effect its descent in a vertical direction, a delimbing unit encircling the trunk of the tree in vertically spaced relation above said cut-off unit for removing the limbs from each trunk section before it is severed from the tree, a transfer arm assembly comprising a support mounted on the vehicle horizontally spaced from the cut-off unit, a transfer arm mounted on said support, jaw means mounted on said transfer arm remote from the support and engageable with each trunk section as the section is severed, and means for swinging the transfer arm and jaws horizontally to move the trunk section horizontally away from the remainder of the tree and means for raising the tree gripping means to raise the remainder of the tree when the trunk section is moved horizontally.

5. A timber harvesting apparatus comprising a self-propelled vehicle for supporting and conveying a vertical timber harvesting device through a timber stand, said device including a single cut-off unit for severing the trunk of a tree at its base and also at successive locations along the trunk to provide bolts of the desired length, means on the cut-off unit to grip the tree and effect its descent in a vertical direction, and a delimbing unit encircling the trunk of the tree in vertical spaced relation above said cut-off unit for removing the limbs from each trunk section before it is severed from the tree, said delimbing unit including a stationary arc and a pair of moveable arcs and means for urging said moveable arcs inwardly to substantially engage the trunk as the trunk descends.

6. A timber harvesting apparatus comprising a self-propelled vehicle for supporting and conveying a vertical timber harvesting device through a timber stand, said device including a single cut-off unit for severing the trunk of a tree at its base and also at successive locations along the trunk to provide bolts of the desired length, means on the cut-off unit to grip the tree and effect its descent in a vertical direction, and a delimbing unit encircling the trunk of the tree in vertically spaced relation above said cut-off unit for removing the limbs from each trunk section before it is severed from the tree, said delimbing unit including a stationary arc and a pair of moveable arcs, means for swinging the moveable arcs between an open position free of the trunk and closed position surrounding the trunk, and means for urging said moveable arcs inwardly when in closed position to substantially engage the trunk as the trunk descends.

7. A timber harvesting machine which comprises a mast, means for positioning said mast adjacent and substantially parallel to a tree trunk, a carriage movable up and down said mast, tree severing means mounted on said carriage and movable therewith between a lower trunk severing position and a raised bolt severing position, a clamp mounted on the mast above the bolt severing position, a delimbing assembly mounted on the mast spaced from the clamp, said delimbing assembly including means for surrounding the trunk of the tree in closely encircling relation thereto, means on the carriage for engaging the trunk above the bolt severing position, and means for drawing the carriage downwardly following severing of the trunk of the tree at trunk severing position and bolt severing position to dispose the trunk in position for repetitive severing at bolt severing position, and for causing removal of limbs by the delimbing assembly.

8. A timber harvesting machine which comprises a self-propelled vehicle, a mast mounted on such vehicle and positionable adjacent and substantially parallel to a tree trunk, a carriage movable up and down said mast, tree severing means mounted on said carriage and movable therewith between a lower trunk severing position and a raised bolt severing position, a clamp mounted on the mast above the bolt severing position, a delimbing assembly mounted on the mast spaced from the clamp, said delimbing assembly including means for surrounding the trunk of the tree in closely encircling relation thereto, means on the carriage for engaging the trunk above the bolt severing position, and means for drawing the carriage downwardly following severing of the trunk of the tree at trunk severing position and bolt severing position to dispose the trunk in position for repetitive severing at bolt severing position, and for causing removal of limbs by the delimbing assembly, and a transfer mechanism mounted on the vehicle and engageable with the trunk when the trunk is severed at bolt severing position, the transfer mechanism being adapted to transfer a bolt to a receptacle when the bolt is severed.

9. A timber harvesting machine which comprises a mast, means for positioning said mast adjacent and substantially parallel to a tree trunk, means on said mast for severing sections of said tree and for drawing the remainder of the tree downwardly as sections thereof are severed, and a delimbing assembly mounted on said mast, said delimbing assembly including a plurality of sections encircling the tree, and means for urging said delimbing assembly sections inwardly around the tree trunk as the tree descends for removing the limbs from the remainder of the tree.

10. A delimbing assembly for a timber harvesting machine which comprises a substantially horizontal plate, a first arc member mounted on said plate, means for holding the plate with the first arc member adjacent the tree, a second arc member pivotally mounted on the plate and swingable crosswise of the first arc member, a third arc member mounted on the plate for reciprocation crosswise of the first arc member, the second and third arc members being movable between a tree trunk encircling position in which the arc members form substantially a circle and a collapsed position in which segments of the arc member surround a reduced area, means for urging the arc members from tree encircling position toward collapsed position, each of said arc members having an upwardly directed limb cutting edge and means for drawing the tree trunk downwardly through the delimbing assembly to strip branches therefrom.

11. A timber harvesting machine which comprises means for holding a trunk of a tree in upright position as cuts are made therein to sever a length of the trunk from the remainder of the tree, means for raising the remainder of the tree to release the length, a transfer arm mounted on the machine, means on the transfer arm for engaging and gripping the length, and means for swinging the transfer arm substantially horizontally to free the length from the remainder of the tree.

12. A timber harvesting machine which comprises means for holding a trunk of a tree in upright position as cuts are made therein to sever a length of the trunk from the remainder of the tree, means for raising the remainder of the tree to release the length, a transfer arm mounted on the machine, means on the transfer arm for engaging and gripping the length, means for swinging the transfer arm substantially horizontally to free the length from the remainder of the tree, and means for swinging the transfer arm upwardly to transfer the length to a receptacle.

13. A timber harvesting machine which comprises means for holding a trunk of a tree in upright position as cuts are made therein to sever a length of the trunk from the remainder of the tree, means for gripping and raising the remainder of the tree to release the length, a transfer arm mounted on the machine, means on the transfer arm for engaging and gripping the length, means for swinging the transfer arm substantially horizontally to free the length from the remainder of the tree, a delimbing assembly encircling the tree above the tree gripping means, and means for drawing the remainder of the tree downwardly through the delimbing assembly to remove branches therefrom.

14. A timber harvesting machine which comprises a framework including a mast section and a receptacle section, a receptacle mounted on the receptacle section, a pair of spaced wheels supporting each section, means pivotally connecting the sections for articulated movement, a mast mounted on the mast section, means on the mast for supporting a trunk of a tree in upright position as cuts are made therein to sever a length of the trunk from the rest of the tree, means on the mast section for raising the mast to raise the remainder of the tree to release the length, a table pivotally supported on the mast section for swinging about an upright axis, a transfer arm pivotally mounted on the table for swinging about a substantially horizontal axis extending transversely of the transfer arm, a jaw supporting shaft mounted on the transfer arm remote from the pivot thereof and extending transversely of the transfer arm, jaws mounted on the jaw supporting shaft engageable with the length to grip the length, means for urging the jaws into length engaging position, a table actuating member pivotally mounted on the upright axis of the table, means interconnecting the table actuating member and the table for swinging the table and the transfer arm substantially horizontally about the upright axis to swing the length from the remainder of the tree, means interconnecting the receptacle supporting section and the table actuating member for swinging the table, the transfer arm, and the table actuating member in unison to align the transfer arm with the receptacle, means on the table for swinging the transfer arm about the horizontal axis to swing the length into position over the receptacle, means for swinging the jaws to bring the length to a substantially horizontal position overlying the receptacle, and means for releasing at least one of the jaws to release the length into the receptacle.

15. A timber harvesting machine which comprises a framework including a mast section and a receptacle section, a receptacle mounted on the receptacle section, a pair of spaced wheels supporting each section, means pivotally connecting the sections for articulated movement, a mast mounted on the mast section, means on the mast for supporting a trunk of a tree in upright position as cuts are made therein to sever a length of the trunk from the rest of the tree, means on the mast section for raising the mast to raise the remainder of the tree to release the length, a table pivotally supported on the mast section for swinging about an upright axis, a transfer arm pivotally mounted on the table for swinging about a substantially horizontal axis extending transversely of the transfer arm, jaws mounted on the transfer arm remote from the pivot thereof and engageable with the length to grip the length, means for urging the jaws into length engaging position, a table actuating member pivotally mounted on the upright axis of the table, means interconnecting the table actuating member and the table for swinging the table and the transfer arm substantially horizontally about the upright axis to swing the length from the remainder of the tree, means interconnecting the receptacle supporting section and the table actuating member for swinging the table, the transfer arm, and the table actuating member in unison to align the transfer arm with the receptacle, means on the table for swinging the transfer arm about the horizontal axis to swing the length into position over the receptacle, and means for releasing at least one of the jaws to release the length to fall into the receptacle.

16. A timber harvesting machine which comprises a framework including a mast section and a receptacle section, a receptacle mounted on the receptacle section, a pair of spaced wheels supporting each section, means pivotally connecting the sections for articulated movement, a mast mounted on the mast section, means on the mast for supporting a trunk of a tree in upright position as cuts are made therein to sever a length of the trunk from the rest of the tree, means on the mast section for raising the mast to raise the remainder of the tree to release the length, a table pivotally supported on the mast section for swinging about an upright axis, a transfer arm assembly including a main transfer arm pivotally mounted on the table for swinging about a substantially horizontal axis extending transversely of the main transfer arm, a jaw supporting shaft mounted on the extension arm remote from the pivot thereof and extending transversely of the extension arm, jaws mounted on the jaw supporting shaft engageable with the length to grip the length, means for urging the jaws into length engaging position, a table actuating member pivotally mounted on the upright axis of the table, means interconnecting the table actuating member and the table for swinging the table and the transfer arm substantially horizontally about the upright axis to swing the length from the remainder of the tree, means interconnecting the receptacle supporting section and the table actuating member for swinging the table, the transfer arm, and the table actuating member in unison to align the transfer arm with the receptacle, means on the table for swinging the transfer arm about the horizontal axis to swing the length into position over the receptacle, means for swinging the jaws to bring the length to a substantially horizontal position overlying the receptacle, and means for releasing at least one of the jaws to release the length to fall into the receptacle.

17. A timber harvesting machine which comprises a framework including a mast section and a receptacle section, a receptacle mounted on the receptacle section, a pair of spaced wheels supporting each section, means pivotally connecting the sections for articulated movement, a mast mounted on the mast section, means on the mast for supporting a trunk of a tree in upright position as cuts are made therein to sever a length of the trunk from the rest of the tree, means on the mast section for raising the mast to raise the remainder of the tree to release the length, a table pivotally supported on the mast section for swinging about an upright axis, a transfer arm assembly including a main transfer arm pivotally mounted on the table for swinging about a substantially horizontal axis extending transversely of the main transfer arm, an extension arm pivotally mounted on the main transfer arm, and means for swinging the extension arm between an extended position extending outwardly of the main transfer arm and a retracted position extending transversely of the main transfer arm, jaws mounted on the extension arm remote from the pivot thereof and engageable with the length to grip the length, means for urging the jaws into length engaging position, a table actuating member pivotally mounted on the upright axis of the table, means interconnecting the table actuating member and the table for swinging the table and the transfer arm substantially horizontally about the upright axis to swing the length from the remainder of the tree, means interconnecting the receptacle supporting section and the table actuating member for swinging the table, the transfer arm, and the table actuating member in unison to align the transfer arm with the receptacle, means on the table for swinging the transfer arm about the horizontal axis to swing the length into position over the receptacle, and means for releasing at least one of the jaws to release the length to fall into the receptacle.

References Cited

UNITED STATES PATENTS 2,948,311   8/1960   McCollum _____ 144—3 X
3,269,436   8/1966   Moore _____ 144—3

WILLIAM W. DYER, JR., *Primary Examiner.*

W. B. BRAY, *Assistant Examiner.*